Patented Oct. 31, 1939

2,178,475

UNITED STATES PATENT OFFICE 2,178,475

COATING COMPOSITION

Friedrich Frick, Uerdingen, Germany, assignor to I. G. Farbenindustrie Aktiengesellschaft, Frankfort-on-the-Main, Germany No Drawing. Application March 19, 1931, Serial No. 523,951. In Germany March 27, 1930

15 Claims. (Cl. 260—6)

This invention relates to improvements in coating compositions especially for purposes of priming or surfacing absorbent foundations.

In accordance with this invention coatings for proofing and filling up the irregularities in absorbent foundations such as wood, natural and artificial stones, felt and fibrous masses of all kinds are produced by means of compositions in which as the binding agent are employed aqueous emulsions of resin-like to oily artificial condensation products of a drying nature containing the radicals of a polyhydric alcohol, a polybasic acid and a monobasic carboxylic acid containing several unsaturated linkages.

The resins used for this purpose are known as mixed acid resins of the polyhydric type. They are obtained, for example, out of glycerol, glycol, polyglycols or polyglycerols, glycerol ethers, pentaerythrite, mannitol, sorbitol and the like by simultaneous or successive esterification with a monobasic acid containing several unsaturated linkages, such as linoleic acid, the dehydration products of ricinoleic acid, eleostearic acid etc. and a polybasic acid, such as phthalic acid, trimellitic acid, succinic acid, maleic acid, diglycollic acid or thiodiglycollic acid etc.

For the manufacture and stabilization of the emulsions an addition of a known emulsifying agent may be used, such as for example alkali metal sulfonates of polyalkylated hydrocarbons, for example, the salts of diisopropyl naphthalene sulfonic acid or dibutyl naphthalene sulfonic acid, salts of sulfonated tar oils or of sulfonated fatty acids, but I prefer the ammonium salts of high molecular aliphatic carboxylic acids, such as wax acids, montanic acid, resin acids or the ammonium salts of alkali soluble proteins, such as, for example, casein. The use of ammonium salts or salts of other easily volatile bases has the advantage that after the application of the masses the volatile base gradually evaporates and the acid is set free whereby the resistance of the coating materials against water is improved. Dryers, such as salts of high molecular organic acids, for example, the manganese salt, lead salt and cobalt salt of naphthenic acid, of the linoleic acid or of a resin acid, may be added to accelerate the drying. The employment of organic solvents is quite unnecessary insofar as oily or soft resin-like condensation products serve as starting materials. When employing more highly condensed, hard, resin-like products, solvents, such as aliphatic and aromatic hydrocarbons, alcohols, ketones, esters and ethers or mixtures thereof may be used, such as white spirit, toluene, butyl alcohol, acetone, propyl ether, ethylbutylate or mixtures of these solvents. The composition of the resin-like condensation product may vary within wide limits both with respect to the kind of material selected and also with regard to the respective proportions of the starting materials; the sole condition is that the products must possess a sufficient degree of drying power. As fillers are suitable those substances which are customarily employed in the manufacture of primers and surfacers, such as ferric oxide, ground slate or talcum, etc.

The invention is illustrated by the following examples:

Example 1

95 parts by weight of a condensation product from 368 parts by weight of glycerine, 834 parts by weight of linoleic acid and 592 parts by weight of phthalic anhydride are worked up to a stable emulsion with the addition of about 1% of a siccative (0.5 part by weight of manganese naphthate and 0.5 part by weight of lead naphthate) and a solution of one part by weight of the sodium salt of diisopropyl naphthalene sulfonic acid and 4 parts by weight of the ammonium soap of a saponifiable wax in 130 parts of water. Then 300–500 parts by weight of a filler, consisting of ferric oxide, ground slate and talcum, are made into a paste with 300–500 parts of water and ground with the above described resin emulsion. The mass can be employed as a surfacer and is applied either by means of a spatula or after sufficient dilution with water by means of brushing or spraying on absorbent foundations, such as, for example, sheets of wood fibre and according to the thickness of the layer gives, after 2–3 hours drying at about 60–80° C., a surface or priming which polishes well.

Example 2

100 parts of a soft artificial product resulting from the reaction between 92 parts of glycerol, 120 parts of phthalic anhydride and 280 parts of eleostearic acid with admixture of a small amount of the lead and manganese salt of a fatty acid with high molecular weight are emulsified with a solution of 3 parts by weight of casein and 0.1 part of ammonia in 120 parts of water. Then 300–500 parts by weight of a filler consisting of ferric oxide, ground slate and talcum are made into a paste with 300–500 parts of water and ground with the above described resin emulsion. The mass can be employed as described in Example 1.

This application is a continuation-in-part of my copending application Serial No. 411,987, filed December 5, 1929, in which I have claimed paints comprising the herein described synthetic resin emulsions and a color pigment.

I claim:

1. As a new composition of matter a coating composition comprising a filler and as binding agent an aqueous emulsion of a condensation product from a polyhydric alcohol, phthalic acid and linoleic acid.

2. As a new composition of matter a coating composition comprising a filler and as binding agent an aqueous emulsion of a condensation product from glycerol, phthalic acid and linoleic acid.

3. As a new composition of matter a coating composition comprising ground slate and as binding agent an aqueous emulsion of a condensation product from gylcerol, phthalic acid and linoleic acid.

4. A composition of matter comprising a filler and a binder comprising an aqueous emulsion of a condensation product of a polyhydric alcohol, a polybasic acid and an unsaturated fatty acid selected from the group consisting of linoleic acid, eleostearic acid and the dehydration products of ricinoleic acid.

5. A composition of matter comprising a filler and a binder comprising an aqueous emulsion of a condensation product of a polyhydric alcohol, phthalic acid and an unsaturated fatty acid selected from the group consisting of linoleic acid, eleostearic acid and the dehydration products of ricinoleic acid.

6. A composition of matter comprising a filler and a binder comprising an aqueous emulsion of a condensation product of a polyhydric alcohol, phthalic acid and an unsaturated fatty acid selected from the group consisting of linoleic acid, eleostearic acid and the dehydration products of ricinoleic acid and an emulsifying agent.

7. A composition of matter comprising a filler and a binder comprising an aqueous emulsion of a condensation product of glycerol, phthalic acid and an unsaturated fatty acid selected from the group consisting of linoleic acid, eleostearic acid, and the dehydration products or ricinoleic acid.

8. A composition of matter comprising a filler and a binder comprising an aqueous emulsion of a condensation product of a polyhydric alcohol, a polybasic acid and an unsaturated fatty acid selected from the group consisting of linoleic acid, eleostearic acid and the dehydration products of ricinoleic acid and an aqueous ammoniacal solution of casein.

9. A composition of matter comprising a filler and a binder comprising an aqueous emulsion of a condensation product of a polyhydric alcohol, a polybasic acid and an unsaturated fatty acid of an oil selected from the group consisting of linseed oil and China-wood oil.

10. A composition of matter comprising a filler and a binder comprising an aqueous emulsion of a condensation product of a polyhydric alcohol, a polybasic acid and an unsaturated fatty acid of an oil selected from the group consisting of linseed oil and China-wood oil and an emulsifying agent.

11. A composition of matter comprising a filler and a binder comprising an aqueous emulsion of a condensation product of glycerol, a phthalic acid and an unsaturated fatty acid of an oil selected from the group consisting of linseed oil and China-wood oil and an emulsifying agent.

12. A composition of matter comprising a filler and a binder comprising an aqueous emulsion of a condensation product of a polyhydric alcohol, a polybasic acid and eleostearic acid.

13. A composition of matter comprising a filler and a binder comprising an aqueous emulsion of a condensation product of glycerol, phthalic acid and eleostearic acid.

14. A composition of matter comprising a filler and a binder comprising an aqueous emulsion of a condensation product of a polyhydric alcohol, a polybasic acid and the dehydration products of ricinoleic acid.

15. A composition of matter comprising a filler and a binder comprising an aqueous emulsion of a condensation product of glycerol, phthalic acid and the dehydration products of ricinoleic acid.

FRIEDRICH FRICK.